United States Patent

[11] 4,218,776

Seidel

[45] Aug. 19, 1980

[54] PARAMETRIC OPTICAL DETECTOR

[75] Inventor: Harold Seidel, Warren, N.J.

[73] Assignee: Bell Telephone Laboratories, Incorporated, Murray Hill, N.J.

[21] Appl. No.: 26,089

[22] Filed: Apr. 2, 1979

[51] Int. Cl.² .............................................. H04B 9/00
[52] U.S. Cl. ................................... 455/619; 455/337
[58] Field of Search ........................ 250/199; 325/487

[56] References Cited

U.S. PATENT DOCUMENTS

| 3,196,274 | 7/1965 | Giordmaine | 250/199 |
| 3,379,888 | 4/1968 | Rossoff | 250/199 |

OTHER PUBLICATIONS

Harvey, A. F., *Coherent Light*, Wiley—Interscience, London, 1970, pp. 1017–1018.

*Primary Examiner*—Howard W. Britton
*Attorney, Agent, or Firm*—Sylvan Sherman

[57] ABSTRACT

Improved signal to noise performance is obtained in an optical detector circuit (10) by impressing a high frequency ($\omega_p$) pumping signal across a varactor photodetector (11) and extracting an output signal that includes the band of frequencies $\omega_p \pm \omega_m$, where $\omega_m$ is the maximum modulation frequency to be recovered by the detector. The modulation signal is recovered in an appropriate amplitude demodulator (15).

4 Claims, 2 Drawing Figures

PARAMETRIC OPTICAL DETECTOR

TECHNICAL FIELD

This invention relates to optical detector circuits and, in particular, to such circuits employing parametric modulation techniques.

BACKGROUND OF THE INVENTION

In a conventional photodetector, such as, for example, a back-biased P-N diode, a photon of incident radiation dissociates an electron-hole pair. Each part then migrates to its majority region, producing a momentary current in an external circuit. The current, thus detected, must then compete for recognition with the noise current of the following amplifier or mixer stage.

A measure of a detector's ability to distinguish between the detected signal and noise is given by the detector's signal-to-noise ratio (S/N) which, in a large measure, serves to determine the basic operating parameters of an optical communication system. For example, for a given error rate, the signal-to-noise ratio is a factor determining the spacing between transmitter and receiver for a given transmitted power. The higher the ratio, the greater the spacing and/or the lower the permissible transmission power.

Aside from improvements in the design of the photodetector itself, various circuit techniques have been devised to improve the S/N ratio of the detector. One such technique, as typified by U.S. Pat. Nos. 3,196,274 and 3,379,888, is to lower the frequency of the detector output signal by means of a resistive mixing process which occurs when a local oscillator signal is injected into the detector circuit. A difficulty with this approach is that while it places the detected signal in a lower frequency range, which may have some advantages vis-a-vis the detector itself, it also places the detected signal in a noisier portion of the following amplifier's operating region. Thus, the advantages of this approach are clearly limited.

An alternate technique is to combine photodetection and parametric amplification in the same device, as described in pages 1017-1018 of the book entitled *Coherent Light* by A. F. Harvey, published by Wiley-Interscience, 1970. However, as reported therein, no significant improvements appear to have been realized as a result of this particular application of parametric interaction.

SUMMARY OF THE INVENTION

The present invention employs parametric up-conversion (rather than amplification) as a means of obtaining improved photodetection. A detector circuit in accordance with the present invention comprises a varactor photodetector, a source of high frequency pump signal coupled to the circuit, and means for extracting an output signal from said circuit, characterized in that the output circuit is tuned to a band of frequencies that includes the frequency of the high frequency pump source and both the upper and lower sidebands produced by the parametric process.

In such a circuit, the charges dissociated by the incident radiation are detected by means of a reactive parametric process produced by the high frequency pumping of the varactor photodetector. The excess charge produced by each photon causes a change in the voltage across the varactor and a resulting output power that is enhanced by a factor proportional to the pumping frequency. The net effect is to increase the overall signal-to-noise ratio by a factor proportional to the ratio of the pump frequency to the modulation bandwidth. In addition, the frequencies of the signals derived from the detector circuit are sufficiently high so as to be in the low noise portion of the following amplifier's operating region.

DETAILED DESCRIPTION

Figure 1:
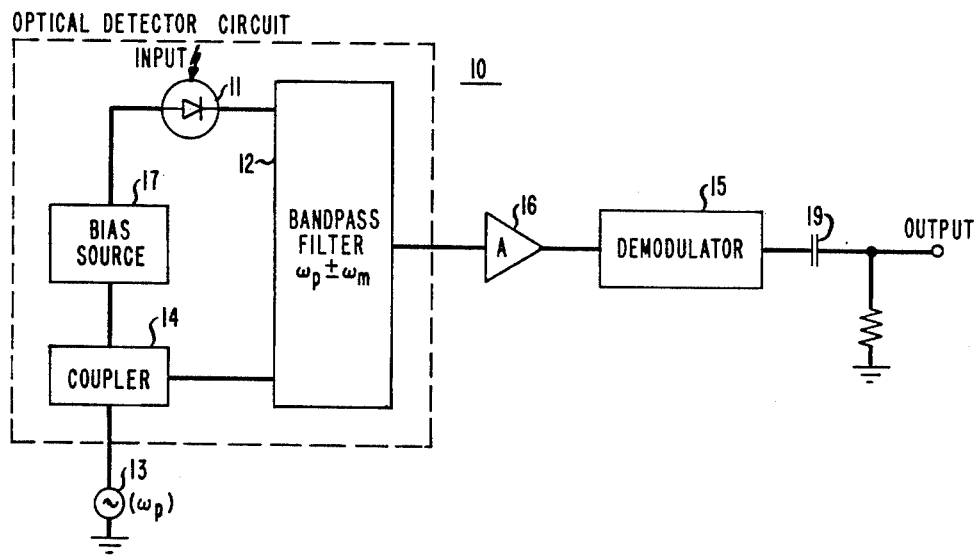
FIG. 1 is a first embodiment of a parametric optical detector in accordance with the present invention.

Referring to the drawings, FIG. 1 shows, in block diagram, an optical parametric detector circuit 10 in accordance with the present invention comprising a varactor type photodetector 11; coupling means 14 for coupling a component of high frequency pumping signal from a source 13 to detector 11; and an output bandpass filter 12 tuned to a band of frequencies which includes the frequency $\omega_p$ of source 13.

The output signal from detector circuit 10 is coupled to an amplifier demodulator 15 wherein the information signal is recovered. An amplifier 16, shown in dashed line, may optionally be included between filter 12 and demodulator 15.

In operation, varactor detector 11 is pumped at an angular frequency $\omega_p$ by a component of signal derived from source 13. Simultaneously, the incident optical radiation modulates the charge in the diode which, in turn, modulates the voltage across the diode. The filter 12, tuned to the pump frequency, isolates the latter and the upper and lower modulation sidebands $\omega_p \pm \omega_m$, where $\omega_m$ is the bandwidth of the information signal impressed upon the optical signal. The information is then recovered in demodulator 15.

In the embodiment described hereinabove, the output from filter 12 includes a relatively large component of pump signal. If we wish to optimize the noise figure, amplifier 16 is preferably a small, high quality (low noise) amplifier. To permit the use of such an amplifier, it is advantageous that the pump signal be suppressed so that only the relatively small amplitude sidebands are applied to the amplifier. This is permissible in this arrangement inasmuch as the pump signal is locally available and can be reinjected in proper phase in a mixer.

Figure 2:
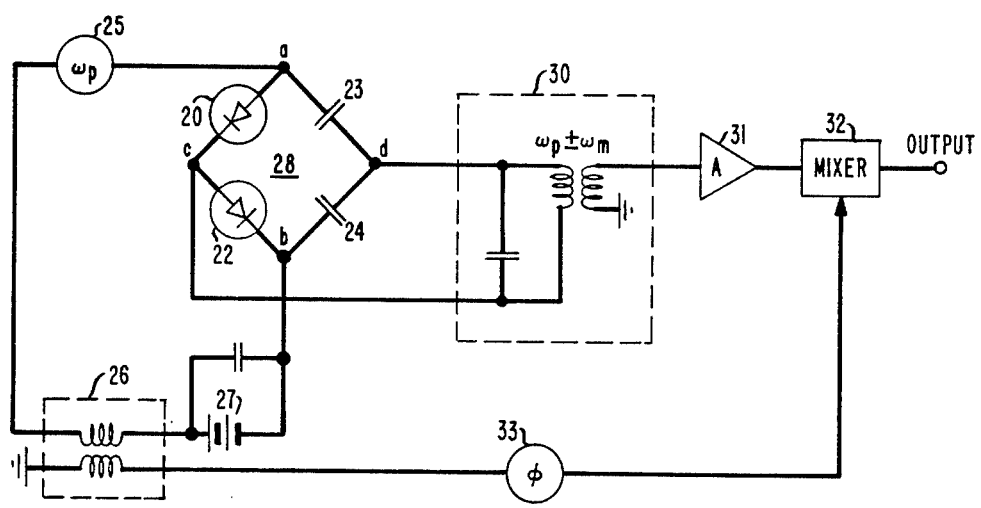
FIG. 2 is a second embodiment of the invention employing a bridge circuit to suppress the pump frequency signal.

FIG. 2, now to be considered, shows an alternate embodiment of the invention in which the pump signal is suppressed. In this embodiment the varactor photodiode 20 is located in a bridge circuit 28 including a second diode 22 and a pair of capacitors 23 and 24. The pump source 25 is applied across the bridge at opposite nodes a, b. An output signal is taken from a second pair of opposite bridge nodes c, d and coupled to filter 30. The output from the filter is coupled through an amplifier 31 to a mixer 32 along with a component of pump signal obtained from pump source 25 by means of a transformer 26. The diodes are back-biased by a d.c. bias source 27.

In the absence of an input optical signal, the bridge is balanced and no signal is coupled to filter 30. When a modulated optical signal is incident upon diode 20, the sidebands generated are not balanced out by the bridge and are coupled to filter 30. The pump signal, however, is suppressed. The resulting "suppressed carrier" signal is coupled to mixer 32 where the "carrier" is reinjected and the modulation information detected. A phase shifter 33 provides a means for adjusting the phase of the pump signal for proper demodulation.

I claim:

1. An optical detector circuit (10) comprising:
   a varactor photodetector (11);
   a source of high frequency signal (13) coupled (14) to said circuit (10);
   and means (12) for extracting an output signal from said circuit;
   CHARACTERIZED IN THAT:
   said means (12) is tuned to a band of frequencies including $\omega_p \pm \omega_m$, where $\omega_p$ is the frequency of said high frequency source and $\omega_m$ is the maximum modulation frequency to be recovered by said detector.

2. The circuit according to claim 1 wherein the output of said means (12) is coupled to a demodulator (15) for recovering any modulation impressed upon the optical signal incident upon said photodetector.

3. The circuit according to claim 1 wherein said photodetector (20) is located in one arm of a bridge circuit (28) for suppressing the component of high frequency pump signal in the detector output.

4. The circuit according to claim 3 wherein the optical detector output signal is coupled to a mixer 32 along with a component of pump frequency for recovering any modulation impressed upon an input optical signal.

* * * * *